(12) United States Patent
Yamaoka et al.

(10) Patent No.: US 7,516,731 B2
(45) Date of Patent: Apr. 14, 2009

(54) APPARATUS AND METHOD FOR CONTROLLING INTERNAL COMBUSTION ENGINE

(75) Inventors: Shiro Yamaoka, Hitachi (JP); Hiromu Kakuya, Hitachi (JP); Kunihiko Suzuki, Hitachinaka (JP); Shinya Satou, Hitachinaka (JP); Atsushi Shimada, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/520,740

(22) Filed: Sep. 14, 2006

(65) Prior Publication Data
US 2007/0062485 A1    Mar. 22, 2007

(30) Foreign Application Priority Data
Sep. 15, 2005   (JP)   ............................. 2005-268644

(51) Int. Cl.
*F02B 17/00* (2006.01)
(52) U.S. Cl. ..................... 123/295; 123/433; 123/681
(58) Field of Classification Search .............. 123/295, 123/27 R, 304, 305, 435, 436, 681
See application file for complete search history.

(56) References Cited

U.S. PATENT DOCUMENTS

| | | | |
|---|---|---|---|
| 6,354,264 B1 * | 3/2002 | Iwakiri et al. ............... | 123/305 |
| 6,390,054 B1 * | 5/2002 | Yang ........................... | 123/295 |
| 6,752,123 B2 * | 6/2004 | Unger et al. ................. | 123/305 |
| 6,772,585 B2 * | 8/2004 | Iihoshi et al. ................ | 60/277 |
| 7,089,913 B2 * | 8/2006 | Yamaoka et al. ........ | 123/406.48 |

FOREIGN PATENT DOCUMENTS

JP    2001-152919 A    6/2001

* cited by examiner

*Primary Examiner*—Stephen K Cronin
*Assistant Examiner*—J. Page Hufty
(74) *Attorney, Agent, or Firm*—Crowell & Moring LLP

(57) ABSTRACT

A control apparatus of an engine having a compression ignition combustion mode and a spark ignition combustion mode selects the spark ignition combustion mode when operation conditions fall within a spark ignition operation area set in a spark ignition operation area/compression ignition operation area setting map memory part and selects the compression ignition combustion mode when the operation conditions fall within a switching stable area set in the memory part upon operation by the spark ignition combustion mode. The control apparatus controls to continue the compression ignition combustion mode as long as the operation conditions fall within a compression ignition operation area set in the memory part upon operation by the compression ignition combustion mode.

13 Claims, 4 Drawing Sheets

APPARATUS AND METHOD FOR CONTROLLING INTERNAL COMBUSTION ENGINE

BACKGROUND OF THE INVENTION

The present invention relates to an apparatus and a method for controlling an internal combustion engine in which a spark ignition combustion mode and a compression ignition combustion mode are switched in accordance with operation conditions and more particularly to such control apparatus and method suitable for control of switching the combustion mode from the spark ignition combustion mode to the compression ignition combustion mode.

In a gasoline engine, there is known an internal combustion engine in which the spark ignition combustion mode in which an air-fuel mixture is spark-ignited by means of an igniter and the compression ignition combustion mode in which the air-fuel mixture is self-ignited by piston compression are switched in accordance with operation conditions.

In the internal combustion engine of the compression ignition combustion system adopting the combustion system in which the air-fuel mixture is compressed to be self-ignited, it is necessary to control the self-ignition combustion in the highly efficient and wide operation area suitably and to control switching of the self-ignition combustion and the spark ignition combustion suitably.

As technique related to the above technique, there is the technique in which stratified charge combustion mode is performed upon switching of the combustion mode of the spark ignition and the compression ignition to thereby suppress variation in torque (for example, JP-A-2001-152919).

SUMMARY OF THE INVENTION

In the above prior-art technique, even if the variation in torque can be suppressed by performing the stratified charge combustion mode upon switching the combustion mode of the spark ignition and the compression ignition, it is difficult to avoid an amount of NOx in the exhaust from being increased.

In order to reduce NOx in the exhaust, a catalytic converter for leaning NOx is required, so that increase of the cost is not avoided.

It is an object of the present invention to provide an apparatus and a method for controlling an internal combustion engine capable of suppressing any of variation in torque and deterioration of exhaust emission suitably upon switching the combustion mode from the spark ignition combustion mode to the compression ignition combustion mode.

In order to achieve the above object, according to the present invention, the control apparatus of the internal combustion engine including combustion state control means for switching a spark ignition combustion mode in which an air-fuel mixture is spark-ignited by means of an igniter and a compression ignition combustion mode in which the air-fuel mixture is self-ignited by piston compression, comprises operation area setting means for setting in accordance with operation conditions a spark ignition operation area in which the engine is operated in the spark ignition combustion mode, a compression ignition operation area in which the engine is operated in the compression ignition combustion mode and a switching stable area in which switching of combustion from the spark ignition combustion mode to the compression ignition combustion mode is allowed, and combustion mode selection means for selecting the spark ignition combustion mode when the operation conditions fall within the spark ignition operation area set by the operation area setting means and selecting the compression ignition combustion mode when the operation conditions fall within the switching stable area set by the operation area setting means upon operation by the spark ignition combustion mode.

According to another aspect of the present invention, the control apparatus of the internal combustion engine including combustion state control means for switching a spark ignition combustion mode in which an air-fuel mixture is spark-ignited by means of an igniter and a compression ignition combustion mode in which the air-fuel mixture is self-ignited by piston compression, comprises operation area setting means for setting in accordance with operation conditions a spark ignition operation area in which the engine is operated in the spark ignition combustion mode, a compression ignition operation area in which the engine is operated in the compression ignition combustion mode and a switching stable area in which switching of combustion from the spark ignition combustion mode to the compression ignition combustion mode is allowed in the compression ignition operation area, and combustion mode selection means for selecting the spark ignition combustion mode when the operation conditions fall within the spark ignition operation area set by the operation area setting means and selecting the compression ignition combustion mode when the operation conditions fall within the switching stable area set by the operation area setting means upon operation by the spark ignition combustion mode, the combustion mode selection means continuously controlling the compression ignition combustion mode as long as the operation conditions fall within the compression ignition operation area set by the operation area setting means upon operation by the compression ignition combustion mode.

According to still another aspect of the present invention, the control apparatus of the internal combustion engine including combustion state control means for switching a spark ignition combustion mode in which an air-fuel mixture is spark-ignited by means of an igniter and a compression ignition combustion mode in which the air-fuel mixture is self-ignited by piston compression, comprises operation area setting means for setting a spark ignition operation area in which the engine is operated in the spark ignition combustion mode and a compression ignition operation area in which the engine is operated in the compression ignition combustion mode, combustion state detection means for detecting a combustion state of the internal combustion engine, and combustion mode selection means for controlling to continue the spark ignition combustion mode by the combustion state control means on the basis of the combustion state detected by the combustion state detection means even when the operation conditions fall within the compression ignition operation area previously set by the operation area setting means upon switching of combustion from the spark ignition combustion mode to the compression ignition combustion mode.

According to a definite aspect of the control apparatus of the internal combustion engine according to the present invention, the combustion state detection means includes any or a combination of intra-cylinder pressure detection means for detecting intra-cylinder pressure of the internal combustion engine, vibration detection means for detecting vibration of the internal combustion engine, ion current detection means for detecting ion current in a combustion chamber and air-fuel ratio detection means for detecting an air-fuel radio.

According to another definite aspect of the control apparatus of the internal combustion engine according to the present invention, a switching stable area is set in the compression ignition operation area and the combustion mode selection means controls to continue the spark ignition combustion mode until the operation conditions reach a state falling within the switching stable area upon switching of combustion from the spark ignition combustion mode to the compression ignition combustion mode and to switch the combustion mode to the compression ignition combustion mode when the operation conditions reach the state falling within the switching stable area.

According to still another definite aspect of the control apparatus of the internal combustion engine according to the present invention, the switching stable area is set to be active within the compression ignition operation area in accordance with detected result of the combustion state detection means.

According to still another aspect of the control apparatus of the internal combustion engine according to the present invention, the compression ignition operation area is defined on the basis of the operation conditions of the internal combustion engine, operation conditions of a power plant driven by the internal combustion engine and intention of a driver of the power plant, and the switching stable area is set in an area in which engine speed and engine torque are lower than those in the compression ignition operation area.

According to still another aspect of the present invention, the control apparatus of the internal combustion engine including combustion state control means for switching a spark ignition combustion mode in which an air-fuel mixture is spark-ignited by means of an igniter and a compression ignition combustion mode in which the air-fuel mixture is self-ignited by piston compression, comprises operation area setting means for setting a spark ignition operation area in which the engine is operated in the spark ignition combustion mode and a compression ignition operation area in which the engine is operated in the compression ignition combustion mode, control amount detection means for detecting a control amount of the combustion state control means, and combustion mode selection means for controlling to continue the spark ignition combustion mode by the combustion state control means on the basis of the control amount of the combustion state control means detected by the control amount detection means even when the operation conditions fall within the compression ignition operation area previously set by the operation area setting means upon switching of combustion from the spark ignition combustion mode to the compression ignition combustion mode.

According to the present invention, the control method of the internal combustion engine comprises setting in accordance with operation-conditions a spark ignition operation area in which the engine is operated in the spark ignition combustion mode, a compression ignition operation area in which the engine is operated in the compression ignition combustion mode and a switching stable area in which switching of combustion from the spark ignition combustion mode to the compression ignition combustion mode is allowed in the compression ignition operation area, selecting the spark ignition combustion mode when the operation conditions fall within the spark ignition operation area, selecting the compression ignition combustion mode when the operation conditions fall within the switching stable area upon operation by the spark ignition combustion mode, and continuing the compression ignition combustion mode as long as the operation conditions fall within the compression ignition operation area upon operation by the compression ignition combustion mode.

According to the control apparatus and the control method of the present invention, since control for continuing the spark ignition combustion mode is performed even when the operation conditions fall within the previously set compression ignition operation area upon switching of combustion from the spark ignition combustion mode to the compression ignition combustion mode, torque variation upon switching of combustion from the spark ignition combustion mode to the compression ignition combustion mode is reduced and deterioration of exhaust emission is also suppressed.

Other objects, features and advantages of the invention will become apparent from the following description of the embodiments of the invention taken in conjunction with the accompanying drawings.

DESCRIPTION OF THE EMBODIMENTS

Embodiments of a control apparatus of an internal combustion engine according to the present invention are now described with reference to the accompanying drawings.

Figure 1A:
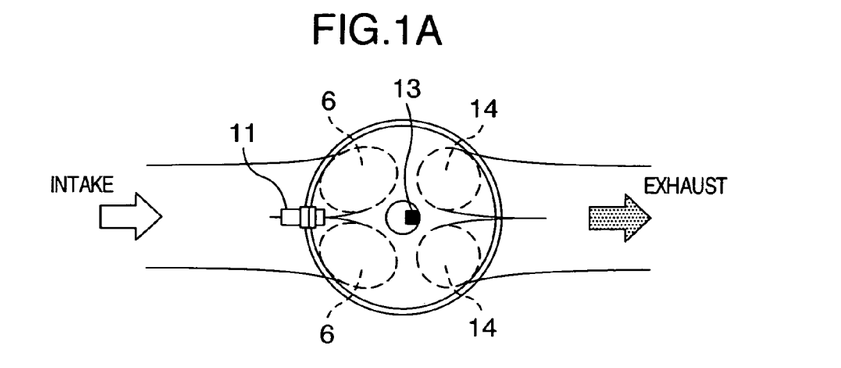
FIG. 1A is a plan view schematically illustrating intake and exhaust ports in an embodiment of a compression ignition type internal combustion engine of a combustion mode switching type to which a control apparatus according to the present invention is applied.
Figure 1B:
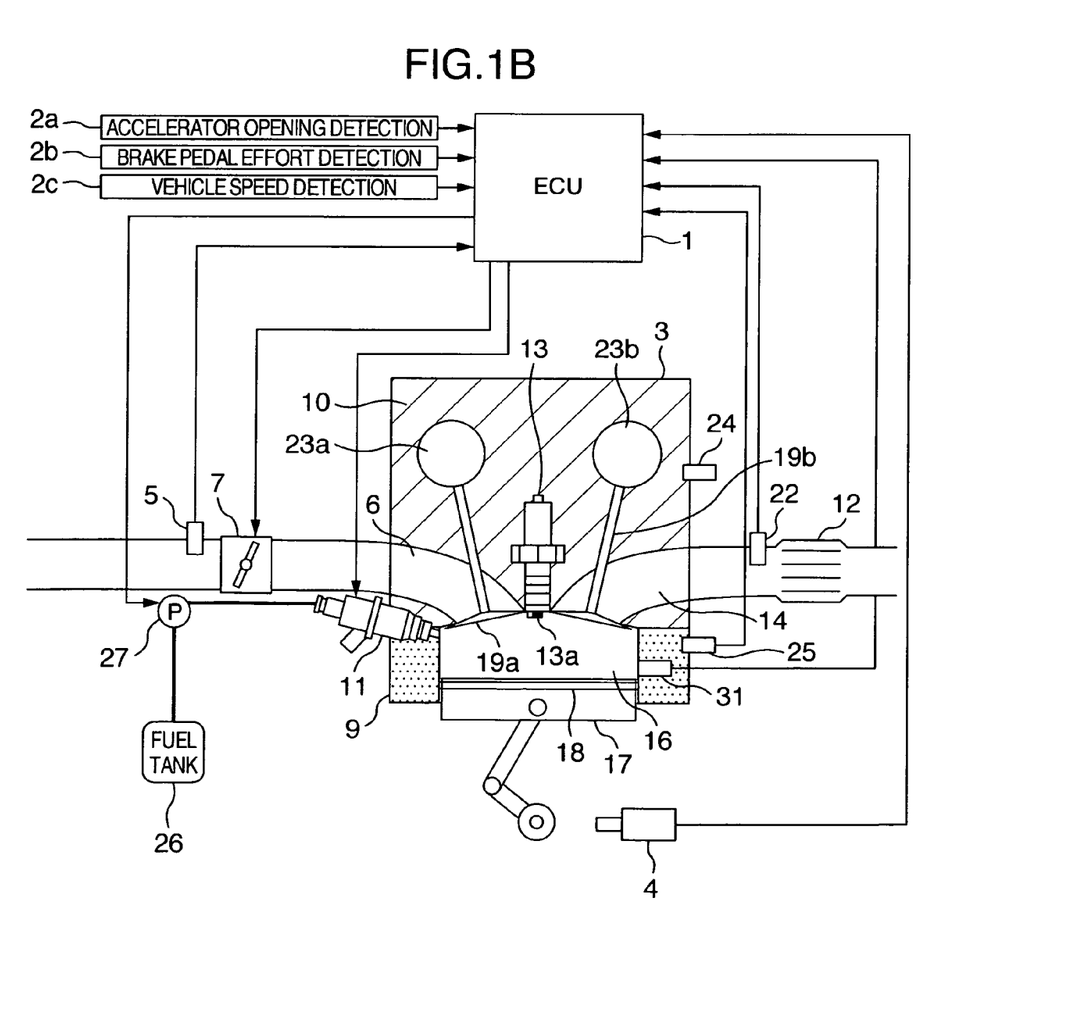
FIG. 1B is a schematic diagram illustrating the whole system configuration of an embodiment of the compression ignition type internal combustion engine of the combustion mode switching type to which the control apparatus according to the present invention is applied.

FIGS. 1A and 1B illustrate an embodiment of an internal combustion engine of a combustion mode switching type of spark ignition combustion and compression ignition combustion to which the control apparatus according to the present invention is applied.

An internal combustion engine 3 includes a combustion chamber 16 defined by a cylinder block 9, a piston 17 and a cylinder head 10. When the internal combustion engine is a multi-cylinder internal combustion engine, a plurality of combustion chambers 16 are formed. An intake port 6 and an exhaust port 14 communicating with the combustion chamber 16 for each cylinder are formed in the cylinder head 10. In the embodiment, the internal combustion engine 3 is a four-port-cylinder internal combustion engine including two intake ports 6 and two exhaust ports 14 formed in each cylinder.

The intake port 6 is opened and closed by an intake valve 19a and the exhaust port 14 is opened and closed by an exhaust valve 19b. The intake valve 19a and the exhaust valve 10b are driven to be opened and closed by variable valve mechanisms 23a and 23b, respectively. The variable valve mechanism 23a varies an opening/closing timing and a valve lift amount of the intake valve 19a to optimum control values in accordance with engine operation conditions and the variable valve mechanism 23b varies an opening/closing timing and a valve lift amount of the exhaust valve 19b to optimum control values in accordance with engine operation conditions.

The variable valve mechanisms 23a and 23b have the function of adjusting an amount of intake air in the same manner as a throttle valve 7 in an engine intake system and functions as a combustion state control device for adjusting an actual compression ratio and an internal exhaust gas recirculation (EGR) amount in the compression ignition combustion mode in addition to the function of adjusting the intake air amount in the embodiment.

The combustion state control device, that is, the variable valve mechanisms 23a and 23b switch the spark ignition combustion mode in which an air-fuel mixture is spark-ignited by means of an igniter and the compression ignition combustion mode in which the air-fuel mixture is self-ignited by piston compression to realize the compression ignition type internal combustion engine of the combustion mode switching type. Operation of valves and actual operation control method will be described later.

An ignition plug 13 is attached to the cylinder head 10 in each cylinder. Spark discharge part 13a of the ignition plug 13 is disposed in the combustion chamber 16.

When the ignition plug 13 is instructed by an engine control unit 1 (hereinafter abbreviated as ECU) to perform spark ignition combustion, spark discharge is performed by the spark discharge part 13a to spark-ignite the air-fuel mixture (air and gasoline) in the combustion chamber 16.

When the ECU 1 instructs the ignition plug 13 to perform compression ignition combustion, the ignition plug 13 can be caused to function as an ion current detection device for detecting a combustion state. In this case, the ignition plug 13 monitors the combustion state and an ignition timing in the combustion chamber 16.

A fuel injection valve 11 is attached to the cylinder block 9 in each cylinder. The fuel injection valve 11 directly injects fuel into the combustion chamber 16. The fuel injection valve 11 is disposed near the inner side of the combustion chamber 16 in the vicinity of the intake valve 19a in FIG. 1B, although its disposition is not limited particularly but it may be disposed in any place as long as fuel can be directly injected into the combustion chamber 16.

Fuel (gasoline) in a fuel tank 26 is pressurized with high pressure by means of a high-pressure pump 27 to be fed into the fuel injection valve 11.

The ECU 1 is of a micro-computer type and is supplied with respective output values (accelerator opening and brake pedal effort) from an accelerator opening detection device 2a constituting a driver intention detection device for detecting the intention of a driver who drives a vehicle in which the compression ignition type internal combustion engine is mounted and from a brake pedal effort detection device 2b.

The ECU 1 is supplied with output values of a vehicle speed detection device 2c functioning as a vehicle traveling state detection device for detecting a traveling state of a vehicle, an air flow sensor 5 for detecting operation conditions of the engine, an engine coolant temperature sensor 24, an air-fuel ratio sensor 22 and a crank angle sensor 4 to perform fuel injection control, ignition timing control and variable control of the intake valve and the exhaust valve.

The air flow sensor 5 preferably has the function of measuring an intake temperature and an output value of the measured intake temperature is also inputted to the ECU 1. An engine load is calculated from the output value of the accelerator opening detection device 2a. Accordingly, the accelerator opening detection device 2a constitutes an engine load detection device. A device for grasping or detecting acceleration of the vehicle in which the compression ignition type internal combustion engine is mounted uses a differential value of the output value of the vehicle speed detection device 2c, although an acceleration sensor may be mounted in the vehicle and an output value thereof may be used. An on/off signal for judging whether a driver steps on a brake pedal or not is used as the output value of the brake pedal effort detection device 2c, although a brake pedal effort sensor may be installed and an output value thereof may be used or an oil pressure sensor may be mounted in an oil pipe for the brake to thereby grasp the brake pedal effort of the driver.

Figure 2A:
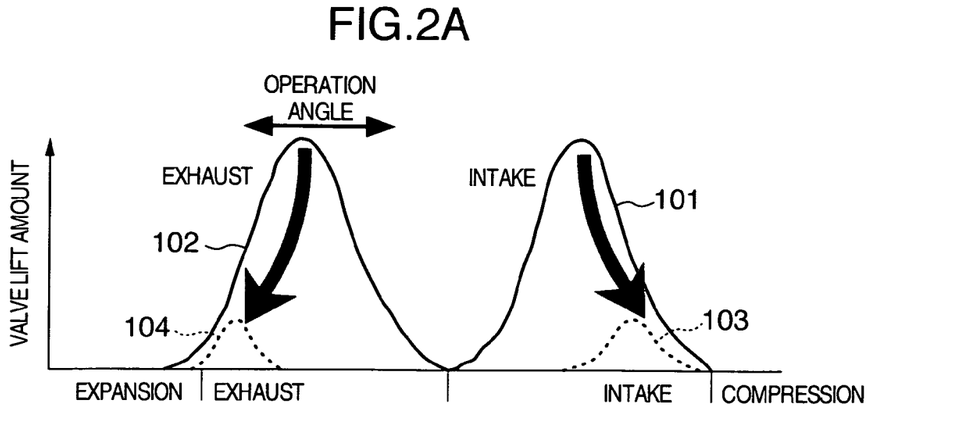
FIGS. 2A, 2B and 2C are graphs showing valve lift characteristics by variable valve mechanisms of the combustion ignition type internal combustion engine of the combustion mode switching type to which the control apparatus according to the present invention is applied.
Figure 2B:
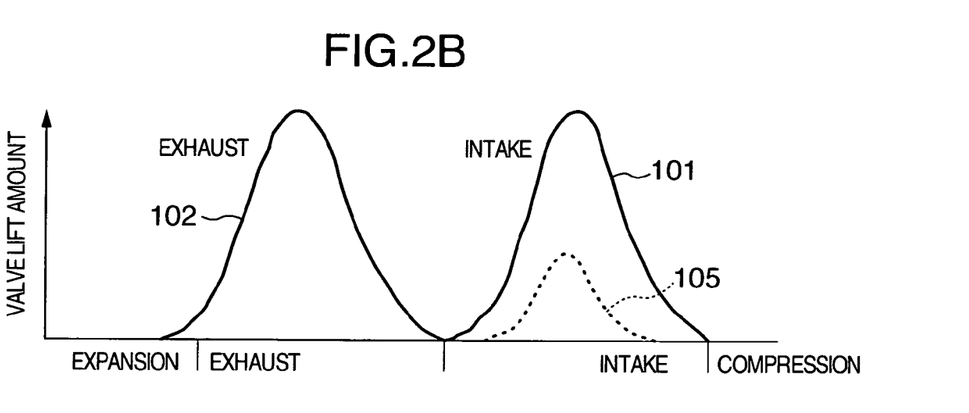
Figure 2C:
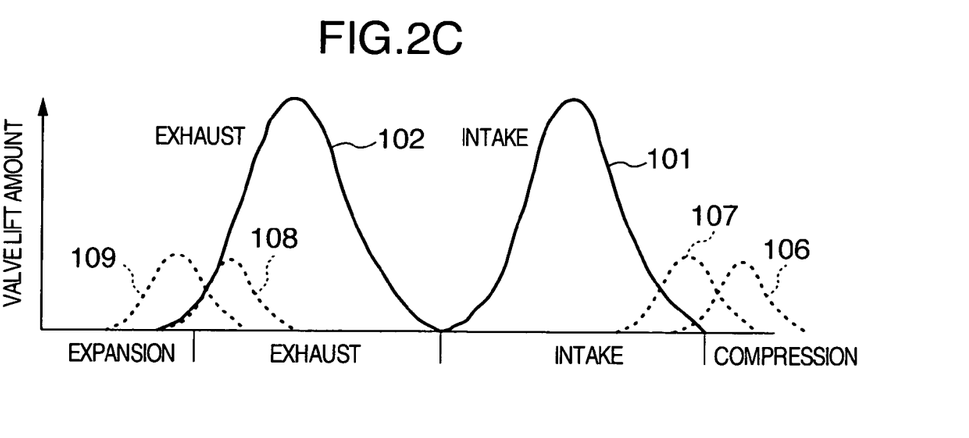

FIGS. 2A to 2C show valve lift characteristics of the variable valves 23a and 23b to which the embodiment is applied. In FIGS. 2A to 2C, the valve timing for introducing the internal EGR is set in order to realize compression ignition.

In FIG. 2A, there are shown intake valve lift 101 and exhaust valve lift 102 in the spark ignition combustion mode and intake valve lift 103 and exhaust valve lift 104 in the compression ignition combustion mode.

An exhaust confining period can be formed by setting the timing by the intake valve lift 103 and the exhaust valve lift 104, so that the length of this period can be controlled to thereby control an internal EGR ratio and control the compression ignition combustion suitably.

Change from the intake valve lifts 101 to 103 and from the exhaust valve lifts 102 to 104 can be realized by continuously changing the variable valve mechanisms 23a and 23b by oil pressure or electronic control and its mechanism and control system do not matter particularly. Further, even if discontinuous change such as two-step change is used instead of the continuous change, it is needless to say that it is the valve lift characteristic intended in FIG. 2A.

In FIG. 2B, the intake valve lift 101 and the exhaust valve lift 102 are effected in the spark ignition combustion mode in the same manner as in FIG. 2A. In addition to the above valve lifts, change of exhaust valve lift 105 is further added in the compression ignition combustion mode to re-suck the exhaust gas discharged once outside of the combustion chamber so that the internal EGR is ensured.

Further, such valve timing control can be made by changing the variable valve mechanisms 23a and 23b by oil pressure or electronic control in the same manner as FIG. 2A and its mechanism and control system do not matter particularly.

In FIG. 2C, control is made as valve lifts 106 to 109 in the compression ignition combustion mode, so that the compression ignition combustion mode by two-stroke operation is performed. In other words, the process of compression, combustion and expansion is performed between the valve lifts 107 and 108. The two-stroke operation has a merit of being easy to leave the internal EGR relatively but it causes knocking in the spark ignition combustion mode while the internal state of the combustion chamber suitable for the compression ignition combustion mode is effected. Further, since the specific output is increased as compared with four-stroke operation, the operation area by the compression ignition combustion mode is spread to about double torque area.

Such valve timing control can be also made by changing the variable valve mechanisms 23a and 23b by oil pressure or electronic control in order to make control to such valve timing and its mechanism and control system do not matter particularly.

In the internal combustion engine 3, the combustion mode is switched to any of the spark ignition combustion mode in which the air-fuel mixture is spark-ignited by means of the ignition plug (igniter) 13 and the compression ignition combustion mode in which the air-fuel mixture is self-ignited by means of piston compression in accordance with the valve timing control by the variable valve mechanisms 23a and 23b and the fact as to whether spark discharge of the ignition plug 13 is present or not.

The internal combustion engine 3 previously sets a spark ignition operation area where the engine is operated in the spark ignition combustion mode and a compression ignition operation area where the engine is operated in the compression ignition combustion mode in accordance with engine torque (load) and engine speed and is operated in any of the spark ignition combustion mode and the compression ignition combustion mode in accordance with the spark ignition operation area and the compression ignition operation area set as above. The compression ignition operation area is the operation area previously defined in accordance with parameters based on the operation conditions of the internal combustion engine 3, the operation state of the power plant (for example, vehicle) in which the internal combustion engine 3 is mounted and user's intention for the power plant.

Figure 3:
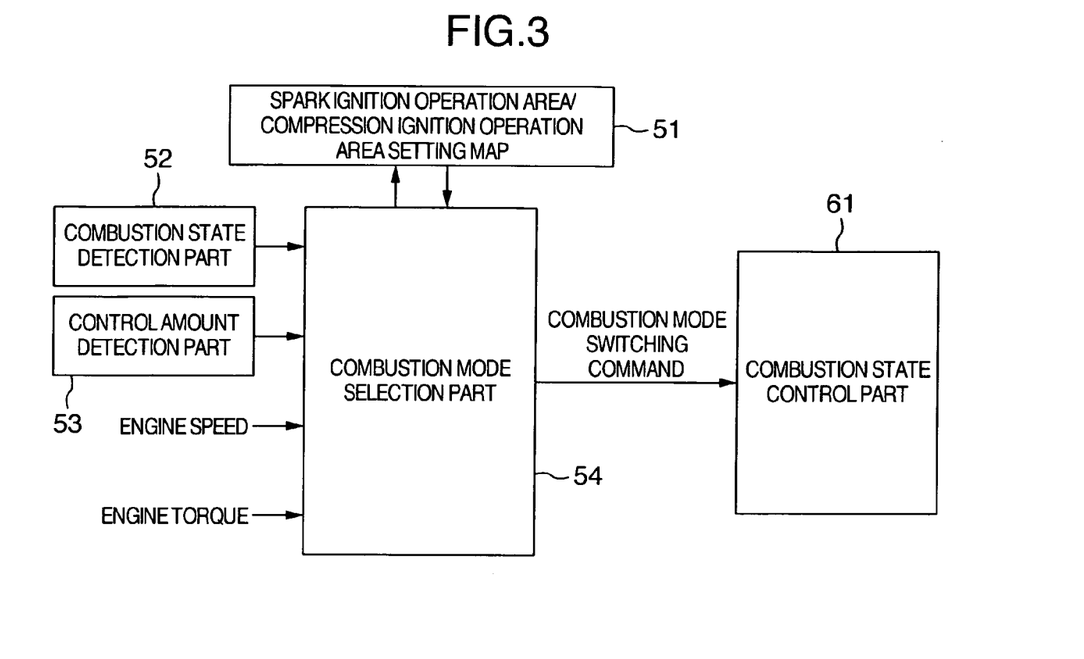
FIG. 3 is a block diagram illustrating an engine control system of the combustion mode switching type in the control apparatus for the internal combustion engine according to the present invention.

Referring now to FIG. 3, an engine control system for switching the combustion mode is described. The engine control system for switching the combustion mode includes a spark ignition operation area/compression ignition operation area setting map memory part 51 functioning as an operation area setting device for previously setting the spark ignition operation area where the engine is operated in the spark ignition combustion mode and the compression ignition operation area where the engine is operated in the compression ignition combustion mode in accordance with the engine torque (load) and the engine speed, a combustion state detection part 52 for detecting the combustion state of the internal combustion engine 3, a control amount detection part 53 for detecting a control amount of a combustion state control part 61 by the variable valve mechanisms 23a and 23b and a combustion mode selection part 54.

The combustion state detection part 52 includes any or a combination of an intra-cylinder pressure detection sensor 31 for detecting intra-cylinder pressure of the internal combustion engine 3, a vibration detection sensor 25 for detecting vibration of the internal combustion engine 3, an ion current detection part (ignition plug) for detecting an ion current in the combustion chamber 16 and the air-fuel ratio sensor 22 for detecting the air-fuel ratio to thereby detect or estimate the combustion state.

The vibration detection sensor 25 constituting the combustion state detection (estimation) part 52 is disposed in the cylinder block 9 or the cylinder head 10 and a frequency detected by the sensor 25 can be analyzed properly to detect or estimate an intra-cylinder pressure peak value and a peak timing thereof in each cylinder. It is ascertained by examination using an actual machine that the compression ignition combustion is characterized in that the heat generation peak timing and the intra-cylinder pressure peak timing are coincident with each other upon proper combustion (high-efficient operation) as different from the spark ignition combustion.

The combustion mode selection part 54 is materialized by software processing by the ECU 1, for example. The combustion mode selection part 54 is supplied with detected values of the engine torque and the engine speed, the detected combustion state by the combustion state detection part 52 and the detected control amount by the control amount detection part 53 to control switching of the spark ignition operation area and the compression ignition operation area set in the spark ignition operation area/compression ignition operation area setting map memory part 51 in accordance with the detected values of the engine torque and the engine speed except the combustion switching time from the spark ignition combustion mode to the compression ignition combustion mode and supply a combustion mode switching command to the combustion state control part 61.

Further, the combustion mode selection part 54 controls to continue the spark ignition combustion mode by the combustion state control part 61 when the combustion state detected by the combustion state detection part 52 or/and the control amount detected by the control amount detection part 53 is equal to a specific value even if the operation conditions fall within the compression ignition operation area previously set in the spark ignition operation area/compression ignition operation area setting map memory part 51 upon switching of combustion from the spark ignition combustion mode to the compression ignition combustion mode.

Figure 4:
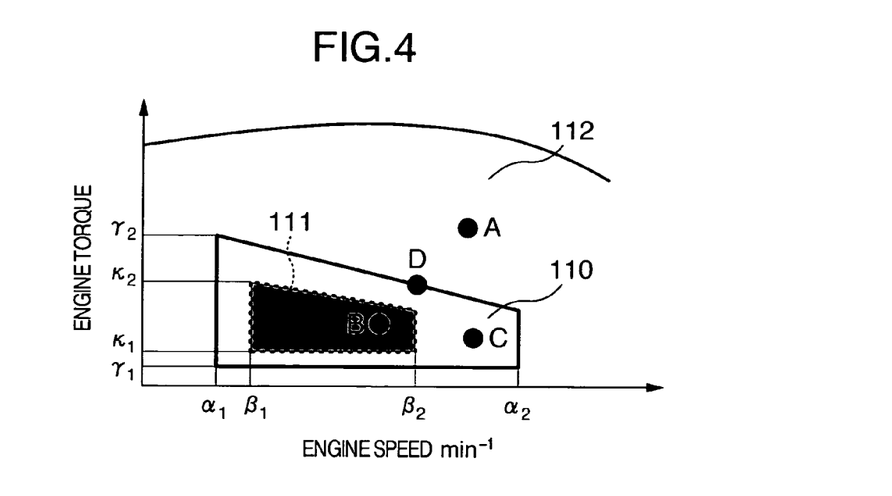
FIG. 4 is a graph showing an example of combustion mode areas of the combustion ignition type internal combustion engine of the combustion mode switching type to which the control apparatus according to the present invention is applied.

FIG. 4 shows operation areas in respective combustion modes stored in the spark ignition operation area/compression ignition operation area setting map memory part 51. Numeral 112 represents a spark ignition combustion mode area and 110 a compression ignition combustion mode area. A combustion switching stable area 111 is defined in the compression ignition combustion mode area 110.

As shown in FIG. 4, the compression ignition combustion mode area 110 is formed into an island in the graph having the ordinate axis representing the engine torque and the abscissa axis representing the engine speed and the combustion switching stable area 111 is formed into an island smaller than the compression ignition combustion mode area 110 therein.

As a result of the experimental research carried out by the inventors, it has been apparent that when the variable valve mechanisms 23a and 23b are controlled in accordance with the characteristics as shown in FIGS. 2A to 2C to thereby control the internal EGR so that the combustion mode is switched from the spark ignition combustion mode to the compression ignition combustion mode, the area where the compression ignition combustion is stabilized and the area where combustion switching can be controlled stably without variation in torque and deterioration of exhaust emission have the relation as shown in FIG. 3. The reason is that specifications and control performance of the variable valves required for combustion switching are different from those for stable combustion of compression ignition.

Accordingly, it can be understood that in order to control the internal combustion engine 3 including the compression ignition combustion mode suitably, it is necessary to previously prescribe the area and the conditions for switching from the spark ignition combustion mode to the compression ignition combustion mode in the ECU 1 at the same time as the area and the conditions for performing compression ignition combustion stably.

For example, with the operation conditions C and D in FIG. 4, compression ignition can be made stably, although in the operation conditions switching from spark ignition to compression ignition cannot be made stably and accordingly after the mode is switched to the compression ignition combustion mode in the operation condition B falling within the combustion switching stable area 111, operation can be made in the compression ignition combustion mode under the operation condition C or D.

Further, even in the combustion switching stable area 111, continuation of the spark ignition combustion mode or switching to the compression ignition combustion mode can be selected on the basis of the combustion state upon switching of the combustion mode.

On the converse, when the combustion mode is switched from the compression ignition combustion mode to the spark ignition combustion mode, the above is not necessarily applicable and the combustion mode can be switched to the spark ignition combustion mode stably in any operation condition in the compression ignition combustion mode.

More particularly, when the combustion mode is switched from the spark ignition combustion mode to the compression ignition combustion mode, the operation conditions (engine torque and engine speed) reach the operation conditions falling within the combustion switching stable area 111 and switching to the compression ignition combustion mode is performed. When the operation conditions fall within the compression ignition compression mode area 110 but fall within the area other than the combustion switching stable area 111, operation by the spark ignition combustion mode is continued. When the state in which operation is made by compression ignition combustion is reached after switching to the compression ignition combustion mode, operation by the compression ignition combustion mode is performed even when the operation conditions fall within the area other than the combustion switching stable area 111 as long as the operation conditions fall within the compression ignition combustion area 110.

In other words, the combustion mode selection part 54 continues the spark ignition combustion mode until the operation conditions reach the state falling within the switching stable area 111 when the combustion mode is switched from the spark ignition combustion mode to the compression ignition combustion mode and the combustion mode selection part 54 controls to switch the combustion mode to the compression ignition combustion mode when the operation conditions reach the state falling within the switching stable area 111.

In brief, the combustion mode selection part 54 selects the spark ignition combustion mode when the operation conditions fall within the spark ignition operation area 112 set in the spark ignition operation area/compression ignition operation area setting map memory part 51 and selects the compression ignition combustion mode when the operation conditions fall within the switching stable area 111 set in the memory part 51 upon operation by the spark ignition combustion mode. The combustion mode selection part 54 controls to continue the compression ignition combustion mode as long as the operation conditions fall within the compression ignition operation area 110 set in the memory part 51 upon operation by the compression ignition combustion mode.

This shows that the hysteresis is given to switching values (engine torque and engine speed) upon switching of combustion from the spark ignition combustion mode to the compression ignition combustion mode and upon switching of combustion from the compression ignition combustion mode to the spark ignition combustion mode.

The switching stable area 111 is not previously and fixedly set but can be actively set within the combustion ignition operation area 110 in accordance with the detected result of the combustion state detection part 52 or/and the detected result of the control amount detection part 53 to attain more satisfactory performances.

The relation of the operation areas shows the example in case of the valve lift characteristic of FIG. 2A, although even if the relation of the operation areas has the valve lift characteristics of FIGS. 2B and 2C, the relation of the operation areas in the combustion modes is the substantially same.

Figure 5:
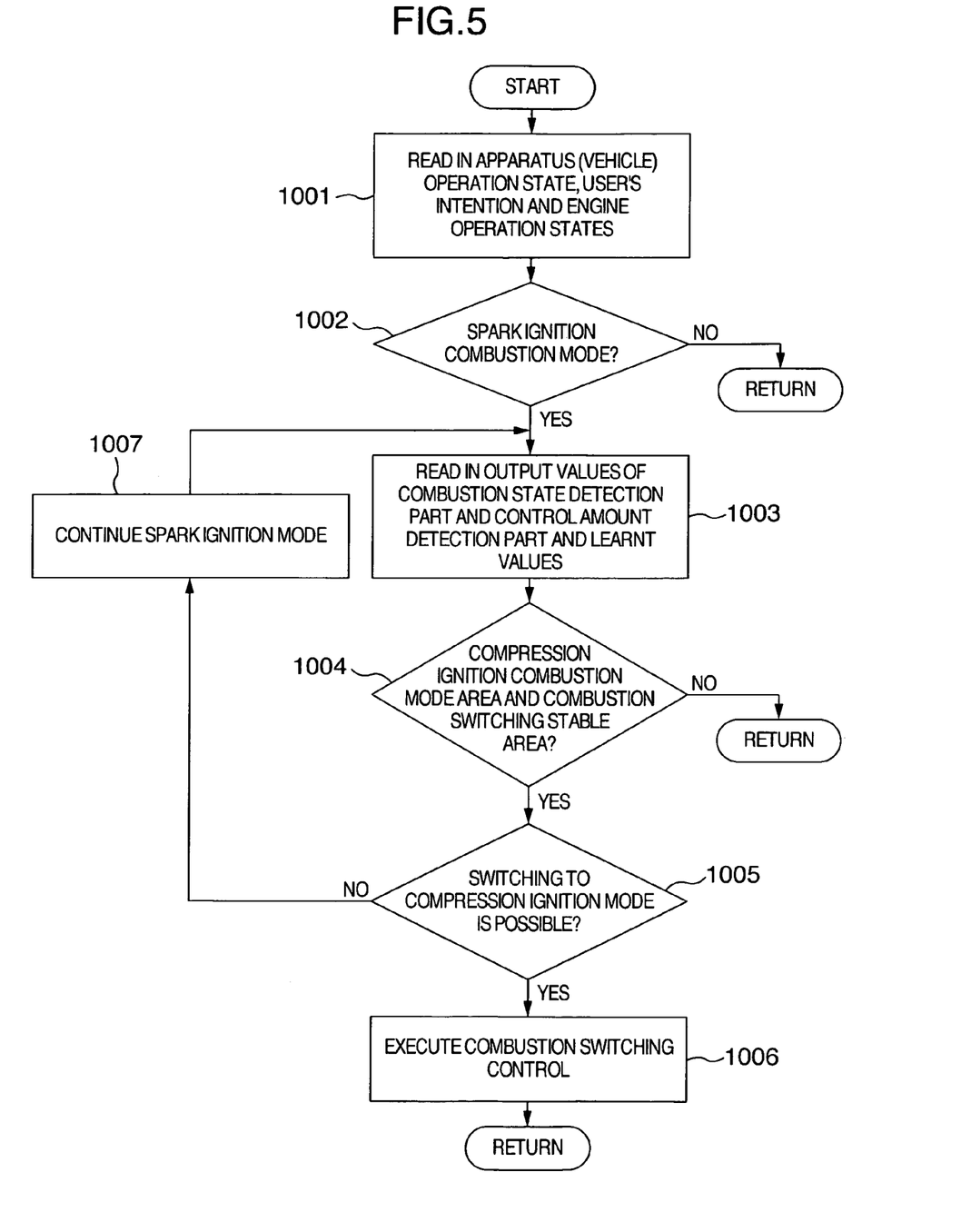
FIG. 5 is a flow chart showing an example of control flow upon switching from the spark ignition combustion mode to the compression ignition combustion mode by the control apparatus of the internal combustion engine according to the present invention.

FIG. 5 shows an example of a flow chart showing control operation in switching from the spark ignition combustion mode to the compression ignition combustion mode in the control apparatus of the internal combustion engine according to the present invention.

First, the control apparatus reads in apparatus (vehicle) traveling state, user's intention (for example, accelerator opening α) and engine operation states (step 1001).

Next, the control apparatus judges whether the current combustion mode is the spark ignition combustion mode or not (step 1002).

The control apparatus reads in the output values of the combustion state detection part 52 and the control amount detection part 53 for detecting the control amount of the combustion state control part 61 and learnt values (step 1003).

The combustion state detection part 52 is preferably the ion current detection device including the ignition plug 13, although it may be the intra-cylinder pressure sensor, the vibration detection sensor 25 and the air-fuel sensor 22.

The control amount detection part 53 is a measure for detecting or estimating a control amount of the variable valve mechanisms 23a and 23b constituting the combustion state control part 61 or a control amount of the actuator for driving the variable valve mechanisms 23a and 23b.

Next, the control apparatus judges whether the current operation conditions fall within the compression ignition combustion mode area 110 and within the combustion switching stable area 111 or not (step 1004).

When it is judged that the current operation conditions fall within the compression ignition combustion mode area 110 and within the combustion switching stable area 111, it is judged on the basis of the inputted values read in steps 1001 and 1003 whether stable combustion switching to the compression ignition combustion mode is executable or not (step 1005).

There is a case where it is judged according to the control amount of the variable valve mechanisms 23a, 23b read in step 1003 that the variable valve mechanisms 23a, 23b are deteriorated or break down. In this case, the compression ignition combustion mode area 110 and the combustion switching stable area 111 previously prescribed in the ECU 1 are rewritten.

When switching to the compression ignition combustion mode is allowed in step 1005, the switching to the compression ignition combustion mode is executed by means of the variable valve mechanisms 23a, 23b.

By performing control in accordance with the above control flow, switching of combustion from the spark ignition combustion mode to the compression ignition combustion mode is performed without variation in torque and deterioration of exhaust emission.

Further, it is apparent that a control apparatus including the similar variable valve mechanisms and switching control other than the above embodiment also falls within the scope of the present invention. The principle of the control apparatus can be utilized not only in switching of the spark ignition combustion mode and the compression ignition combustion mode but also in switching from the usual diffusion combustion mode to the pre-mixing combustion mode in which EGR is introduced in large quantities in a diesel engine.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A control apparatus of an internal combustion engine in which a combustion mode is changed-over between a spark ignition combustion mode in which an air-fuel mixture is spark-ignited by an igniter and a compression ignition combustion mode in which the air-fuel mixture is self-ignited by piston compression, comprising a combustion mode selector configured such that
a spark ignition operation area in which the engine is capable to be operated in the spark ignition combustion mode, a compression ignition operation area in which the engine is capable to be operated in the compression ignition combustion mode and a switching stable area which is arranged within the compression ignition operation area are previously set depending on operation conditions of the engine,
(a) when a present operation of the engine in the spark ignition combustion mode falls within the switching stable area, the combustion mode of the engine is changed to the compression ignition combustion mode,
(b) when a present operation of the engine in the spark ignition combustion mode falls within the compression ignition operation area other than the switching stable area, the combustion mode of the engine is continued in the spark ignition combustion mode,
(c) when a present operation of the engine in the compression ignition combustion mode falls within the spark ignition operation area, the combustion mode of the engine is changed to the spark ignition combustion mode, and
(d) when a present operation of the engine in the compression ignition combustion mode is still within the compression ignition operation area other than the switching stable area, the combustion mode of the engine is continued in the compression ignition combustion mode.

2. A control apparatus of an internal combustion engine according to claim 1, further comprising a combustion state detection means for detecting the spark ignition combustion mode and the compression ignition combustion mode wherein the combustion state detection means includes any or a combination of intra-cylinder pressure detection means for detecting intra-cylinder pressure of the internal combustion engine, vibration detection means for detecting vibration of the internal combustion engine, ion current detection means for detecting ion current in a combustion chamber and air-fuel ratio detection means for detecting an air-fuel ratio.

3. A control apparatus of an internal combustion engine according to claim 1, wherein the switching stable area is set in the compression ignition operation area, and the combustion mode selector controls to continue the spark ignition combustion mode until the operation conditions reach a state falling within the switching stable area upon switching of combustion from the spark ignition combustion mode to the compression ignition combustion mode and to switch the combustion mode to the compression ignition combustion mode when the operation conditions reach the state falling within the switching stable area.

4. A control apparatus of an internal combustion engine according to claim 3, wherein the switching stable area is set to be active within the compression ignition operation area in accordance with detected result of the combustion state detection means.

5. A control apparatus of an internal combustion engine according to claim 1, wherein the compression ignition operation area is defined on the basis of the operation conditions of the internal combustion engine, operation conditions of a power plant driven by the internal combustion engine and intention of a driver of the power plant.

6. A control apparatus of an internal combustion engine according to claim 3, wherein the switching stable area is set in an area in which engine speed and engine torque are lower than those in the compression ignition operation area.

7. A control apparatus of an internal combustion engine including combustion state control means for switching a spark ignition combustion mode in which an air-fuel mixture is spark-ignited by an igniter and a compression ignition combustion mode in which the air-fuel mixture is self-ignited by piston compression, comprising:
operation area setting means for setting a spark ignition operation area in which the engine is operated in the spark ignition combustion mode and a compression ignition operation area in which the engine is operated in the compression ignition combustion mode and within which a switching stable area is set based upon operational conditions of the engine;
control amount detection means for detecting a control amount of the combustion state control means; and
combustion mode selection means for controlling to continue the spark ignition combustion mode by the combustion state control means on the basis of the control amount of the combustion state control means detected by the control amount detection means even when the operation conditions fall within the compression ignition operation area previously set by the operation area setting means upon switching of combustion from the spark ignition combustion mode to the compression ignition combustion mode such that when a present operation of the engine in the spark ignition combustion mode falls within the compression ignition operation area other than the switching stable area, the combustion mode of the engine is continued in the spark ignition combustion mode,
when a present operation of the engine in the compression ignition combustion mode falls within the spark ignition operation area, the combustion mode of the engine is changed to the spark ignition combustion mode, and
when a present operation of the engine in the compression ignition combustion mode is still within the compression ignition operation area other than the switching stable area, the combustion mode of the engine is continued in the compression ignition combustion mode.

8. A control apparatus of an internal combustion engine according to claim 5, wherein the switching stable area is set in the compression ignition operation area, and the combustion mode selector controls to continue the spark ignition combustion mode until the operation conditions reach a state falling within the switching stable area upon switching of combustion from the spark ignition combustion mode to the compression ignition combustion mode and to switch the combustion mode to the compression ignition combustion mode when the operation conditions reach the state falling within the switching stable area.

9. A control apparatus of an internal combustion engine according to claim 7, wherein a switching stable area is set in the compression ignition operation area and the combustion mode selection means controls to continue the spark ignition combustion mode until the operation conditions reach a state falling within the switching stable area upon switching of combustion from the spark ignition combustion mode to the compression ignition combustion mode and to switch the combustion mode to the compression ignition combustion mode when the operation conditions reach the state falling within the switching stable area.

10. A control apparatus of an internal combustion engine, according to claim 7, wherein a switching stable area is set to be active within the compression ignition operation area in accordance with detected result of the control amount detection means.

11. A control apparatus of an internal combustion engine, according to claim 8, wherein the switching stable area is set to be active within the compression ignition operation area in accordance with detected result of the control amount detection means.

12. A control apparatus according to claim 1, wherein when the engine is operated with the compression ignition combustion mode in the compression ignition operation area but, in an area outside of the switching stable area, the combustion mode of the engine is continued in the compression ignition combustion mode.

13. A control method for an engine in which a combustion mode is changed-over between a spark ignition combustion mode in which the engine is capable of being operated in a spark ignition operation area and an air-fuel mixture is spark-ignited by an igniter and a compression ignition combustion mode in which the engine is capable of being operated in a compression ignition combustion mode and the air-fuel mixture is self-ignited by piston compression, said method, comprising:

changing the combustion mode of the engine to the compression ignition combustion mode when a present operation area of the engine in the spark ignition combustion mode falls within a switching stable area which is previously defined within a compression ignition operation area in which the engine is operated in the compression ignition combustion mode in dependence on engine operational conditions, continuing the combustion mode of the engine in the spark ignition combustion mode when the present operation area of the engine in the spark ignition combustion mode does not fall within the switching stable area which is arranged within the compression ignition operation area, and continuing the combustion mode of the engine in the compression ignition combustion mode when the present operation area of the engine in the compressor ignition combustion mode remains within the compression ignition operation area but not the switching stable area.

* * * * *